Feb. 27, 1968     C. H. TOLMAN     3,371,219

MAGNETORESISTIVE AND GATE

Filed Dec. 27, 1965

INVENTOR
CHARLES H. TOLMAN

BY Thomas J Nikolai
ATTORNEY

United States Patent Office 3,371,219
Patented Feb. 27, 1968

3,371,219
MAGNETORESISTIVE AND GATE
Charles H. Tolman, Bloomington, Minn., assignor to Sperry Rand Corporation, New York, N.Y., a corporation of Delaware
Filed Dec. 27, 1965, Ser. No. 516,250
4 Claims. (Cl. 307—88)

The present invention relates to an AND gate that employs the magnetoresistive phenomena of thin ferromagnetic films with uniaxial anisotropy.

One of the logic devices used in computer arithmetic is the AND gate. This device has two or more input sections and one output section, where an output is realized only if all input sections are supplied with a signal. To date, the AND gates are predominately the transistor-resistor logic type (TRL). The disadvantages of the prior art AND gates include power requirements and speed of operation. The present invention uses thin films which have extremely low power requirements and operate in the nanosecond range.

In the present invention, magnetic thin films are electrically connected in the form of a Wheatstone bridge. Under normal conditions, a detector coupled to the bridge will indicate that the bridge is balanced. Input lines are inductively coupled to the thin films such that when any one of the input lines carries a signal, the bridge remains balanced and no output is indicated by the detector. When each of the input lines provides a signal, the magnetoresistance of the films change such that an unbalance occurs and the detector provides an output signal. Thus, the AND function is indicated by the presence of a signal on the output of the detector.

The magnetoresistive effect in thin magnetic films can be described as a change in the electrical resistance of the material caused by a rotation of the magnetization. The application of a magnetic field to a film, or the application of a stress to a magnetostrictive film will, in general, rotate the magnetization. The resistance of the film can be expressed as (1) $$R = (R_a - R_b) \cos^2\theta + R_b$$

where $\theta$ is the angle between the magnetization and the direction of the resistance measurement sense line, and $R_a$ and $R_b$ are constants of the material ($R_a > R_b$).

Figure 1:
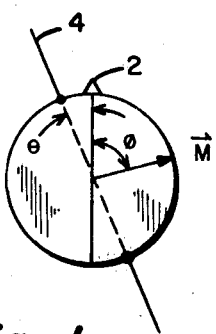
FIG. 1 is a diagram showing the relationship between the resistance measurement sense line, the easy axis and the rotating magnetic vector.

With reference to FIG. 1, if $\theta$ is the angle between the rest state of the magnetization 2 (easy axis) and the resistance sense line 4, and if $\phi$ is the angle of magnetization rotation away from the easy axis, then the change in resistance, $\Delta R$, due to the rotation is (2) $$\Delta R = (\Delta R)_0 [\cos^2(\theta + \phi) - \cos^2\theta]$$

where $(\Delta R)_0 = R_a - R_b$ and is the maximum change in resistance.

Figure 2:
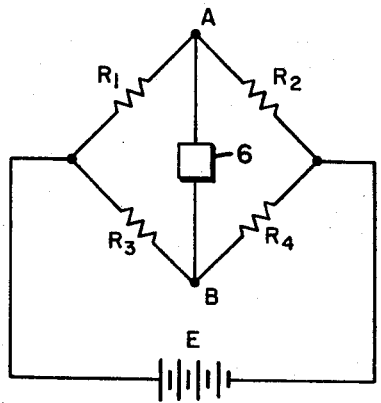
FIG. 2 shows a direct current Wheatstone bridge.

FIG. 2 shows a direct current Wheatstone bridge with resistors $R_1$, $R_2$, $R_3$ and $R_4$ and voltage detector 6. Under balance conditions, when detector 6 observes no voltage difference between points A and B, the relationship between the resistors is (3) $$R_1 R_4 = R_2 R_3$$

If the resistances do not satisfy this condition, then the bridge is unbalanced and detector 6 observes a voltage difference, $E_o$;

(4) $$E_o = \left(\frac{R_1}{R_1 + R_2}\right) E - \left(\frac{R_3}{R_3 + R_4}\right) E$$

Figure 3:
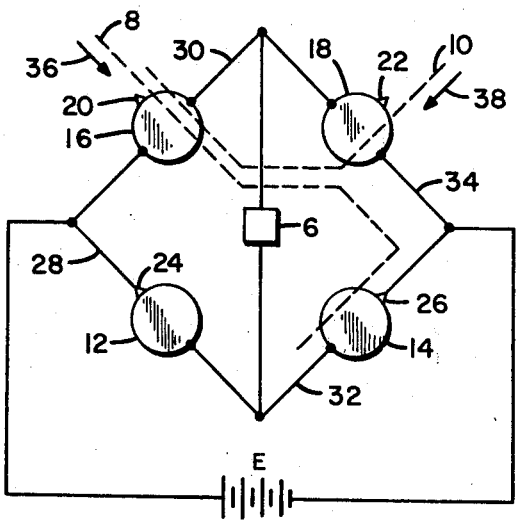
FIG. 3 shows the preferred embodiment of the invention in the form of a Wheatstone bridge with thin magnetic films replacing resistors.

FIG. 3 is essentially the same as FIG. 2 but thin magnetic films 12, 14, 16 and 18 with uniaxial anisotropy have replaced the four resistors. The easy axis direction of the four films are as shown by vectors 20, 22, 24 and 26. Drive lines 8 and 10 are inductively coupled to the films as shown and, therefore, apply a magnetic field 90° removed from the easy axis when a current is caused to flow. The resistance measurement sense lines 28, 30, 32 and 34 are paralled ($\theta = 0°$) to the rest state of the magnetization in films 12 and 14 and perpendicular ($\theta = 90°$) in films 16 and 18. Therefore, from Equation 1, $$R_{16} = R_{18} = R_b \text{ and } R_{12} = R_{14} = R_a$$

where, as explained previously, $R_a$ and $R_b$ are constants of the material of the magnetic film. Substitution of these values into Equation 3 indicates that the bridge is in balance under these conditions.

If a current is passed through drive line 10 of such amplitude so that the applied magnetic field rotates the magnetization of films 16 and 18 90° ($\phi = 90°$), then the new resistances are $R_{16} = R_{18} = R_a$ with the unchanged resistances $R_{12} = R_{14} = R_a$. Substitution of these values into Equation 3 yields the balance conditions and detector 6 observes a null.

If a current is passed through drive line 8 so that $\phi = 90°$ for films 14 and 16, then the new resistances are $R_{16} = R_a$ and $R_{14} = R_b$ with the unchanged resistances $R_{18} = R_b$ and $R_{12} = R_a$. Substitution of these values into Equation 3 yields the balance condition and again detector 6 observes a null.

If currents of the same polarity are passed through drive lines 8 and 10 simultaneously in the direction shown in FIG. 3 by arrows 36 and 38, then the resulting magnetic fields cancel in the area of film 16. As a result, the new resistances are $R_{16} = R_b$ (unchanged), $R_{18} = R_a$, $R_{12} = R_a$ (unchanged), and $R_{14} = R_b$. These values do not satisfy the balance condition of Equation 3. Thus, the bridge is unbalanced only when both of said drive lines are energized. The voltage difference observed by detector 6 can be found from Equation 4:

(5) $$E_o = \left(\frac{R_b - R_a}{R_b + R_a}\right) E$$

Equation 5 can be rewritten as (6) $$E_o = -\left(\frac{(\Delta R)_0}{2R'}\right) E$$

where $R'$ is the average of $R_a$ and $R_b$ and is approximately equal to $R_0$ or $R_1$. The term $(\Delta R)_0/R'$ in Equation 6 is approximately 3% for 81 Permalloy used in the formation of thin magnetic films and, therefore, the output voltage, $E_o$, is 1.5% of the applied voltage, E.

Of course, film 12 could be replaced with a resistor without affecting operation of the circuit. This resistor could be variable to assist in balancing the bridge.

Figures 4, 5:
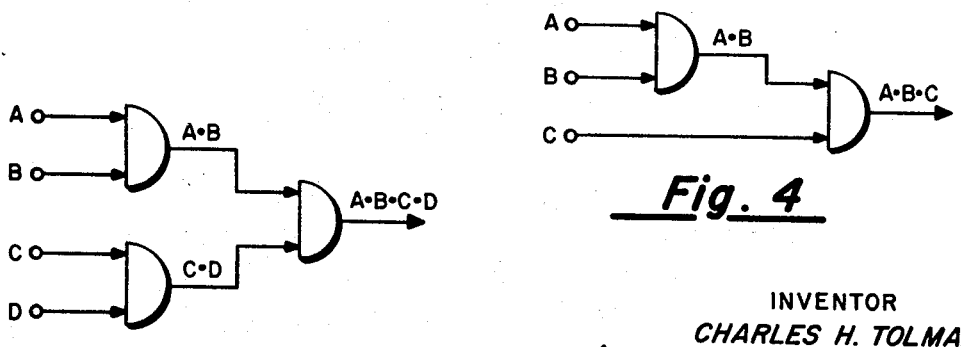
FIG. 4 shows how the invention may be used to form a three input AND gate.
FIG. 5 shows how the invention may be used to form a four input AND gate.

The operation description presented above demonstrates that two coincident input signals are necessary for an output to be realized from the gate. This is the operational requirement demanded of an AND gate. The two-input gate can be extended to three, four, or more input gates as shown in FIGURES 4 and 5. Each AND gate shown requires a thin film resistive bridge.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

What is claimed is:

1. An AND gate comprising:
   (a) a plurality of magnetic elements having magnetoresistive properties connected in the form of a balanced Wheatstone bridge,
   (b) drive lines inductively coupled to said elements for changing the resistance of said elements when said lines are energized, said lines being selectively coupled to said elements such that said bridge is unbalanced only when all of said drive lines are energized, and
   (c) bridge output means for providing a signal when said bridge is unbalanced.

2. An AND gate comprising:
   (a) a plurality of magnetic film elements having magnetoresistive properties, each of said elements having an easy axis of magnetization and a rotatable magnetic vector,
   (b) conductors connecting said films in the form of a magnetoresistively balanced Wheatstone bridge for providing current flow through each of said elements in a given direction relative to said easy axis to cause each element to assume a maximum or a minimum resistance value,
   (c) drive lines inductively coupled to said elements for rotating said magnetic vectors and changing the resistance of said elements when said lines are energized, said lines being selectively coupled to said elements in a given direction relative to said easy axis such that said bridge is unbalanced only when all of said drive lines are energized, and
   (d) bridge output means for providing a signal when said bridge is unbalanced.

3. In the AND gate of claim 2,
   (a) a first pair of said elements inductively coupled to a first one of said drive lines, and
   (b) a second pair of said elements inductively coupled to a second one of said drive lines, said second pair of elements including one of said first pair.

4. The AND gate of claim 3 including:
   (a) a detector coupled to said bridge output means for detecting said output signal.

References Cited

UNITED STATES PATENTS

| | | | |
|---|---|---|---|
| 3,146,353 | 8/1964 | Pohm | 307—88 |
| 3,151,315 | 9/1964 | Dunham et al. | 340—174 |
| 3,337,745 | 8/1967 | Irons | 307—88 |

JOHN F. COUCH, *Primary Examiner.*